United States Patent [19]

Holmes

[11] 4,374,400
[45] Feb. 15, 1983

[54] TELEVISION GHOST CANCELLATION SYSTEM WITH GHOST CARRIER PHASE COMPENSATION

[75] Inventor: David D. Holmes, Chesterfield, N.J.

[73] Assignee: RCA Corporation, New York, N.Y.

[21] Appl. No.: 274,180

[22] Filed: Jun. 16, 1981

[51] Int. Cl.³ .............................................. H04N 5/21
[52] U.S. Cl. .................................... 358/167; 358/905
[58] Field of Search ..................... 358/35, 36, 37, 160, 358/167, 905, 188

[56] References Cited

U.S. PATENT DOCUMENTS

| | | | |
|---|---|---|---|
| 4,047,224 | 9/1977 | Yamaguti | 411/222 |
| 4,128,848 | 12/1978 | Nakagawa | 358/167 |
| 4,285,006 | 8/1981 | Kurahashi et al. | 358/35 |

FOREIGN PATENT DOCUMENTS 52-34623 3/1977 Japan .................................. 358/905

OTHER PUBLICATIONS

An Article "A Tutorial on Ghost Cancelling in Television Systems" by W. Ciciora, et al. Published in IEEE Trans. CE-25, Feb. 1979, pp. 11 and 12 and FIG. 14.

Primary Examiner—Robert L. Richardson
Attorney, Agent, or Firm—E. M. Whitacre; P. J. Rasmussen; W. B. Yorks, Jr.

[57] ABSTRACT

A television ghost signal cancellation system is provided in which the video intermediate frequency signal is demodulated by two synchronous detectors. A picture carrier extractor produces a first reference signal for the first of the synchronous detectors exhibiting a phase which is aligned with that of the picture carrier of the direct television signal. The first reference signal is shifted in phase by a controllable phase shifter to develop a second reference signal for the second synchronous detector. The output of the second synchronous detector is delayed by an amount of time equal to the difference in time between the appearance of the direct signal and a detected ghost signal. The amplitude and polarity of the delayed signal are adjusted by a control circuit to produce a pseudo-ghost signal. An amplitude comparator compares the amplitude of the pseudo-ghost signal with that of the output signal of the first synchronous detector. The resultant amplitude comparison signal is sampled and stored during a sampling interval, and the stored signal is used to control the adjustment provided by the amplitude and polarity control circuit. A phase comparator is responsive to the outputs of the amplitude and polarity control circuit and the first synchronous detector for producing a phase comparison signal. The phase comparison signal is sampled and stored during a sampling interval, and the stored phase comparison signal is used to control the phase shift provided by the controllable phase shifter. The pseudo-ghost signal and the output of the first synchronous detector are summed to produce a deghosted video signal.

6 Claims, 3 Drawing Figures

TELEVISION GHOST CANCELLATION SYSTEM WITH GHOST CARRIER PHASE COMPENSATION

This invention relates to television ghost signal cancellation systems and, in particular, to a ghost cancellation system which produces a pseudo-ghost signal compensated for the phase of the ghost carrier signal.

Television reception has long been plagued by the reception of undesired multiple signals. These undesired signals, reflected from buildings and other large objects, appear as delayed versions of the direct television signal, and are commonly referred to as ghost signals in the reproduced image. The ghost signals will be delayed from the direct signal as a function of the relationship of the signal path lengths between the direct and the ghost signals. The randomness of this relationship from one receiver location to another dictates that the phase of the ghost carrier signal may have any relationship to the phase of the direct signal. In order to fully remove the ghost signal from the direct signal, it is necessary to consider both the delay of the ghost signal and its carrier phase relative to the direct television signal.

A ghost cancellation system which considers both the ghost delay and its carrier phase is shown in U.S. Pat. No. 4,047,224. In this system, the intermediate frequency television signal is demodulated by a first synchronous detector using a reference signal which is aligned in phase and frequency with the picture carrier of the direct signal. The output of this synchronous detector is coupled to one input of an adder. The intermediate frequency television signal is also demodulated by a second synchronous detector using a phase-shifted version of the reference signal. The reference signal is suitably shifted in phase to be aligned in phase and frequency with the picture carrier of the ghost signal. The output signal produced by the second synchronous detector is delayed by a delay time corresponding to the difference in arrival time between the direct and ghost signals. The delayed signal is then modified in polarity and amplitude, and the resultant signal, termed a pseudo-ghost signal, is applied to a second input of the adder. Since the pseudo-ghost signal is demodulated by a reference signal with a phase aligned with that of the ghost signal, virtually complete cancellation of the ghost signal of the first synchronous detector will occur.

The aforementioned United States patent, however, requires manual adjustment of a variable phase shifter and a polarity and gain control circuit in order to produce the desired pseudo-ghost signal. It is desirable for such a system to operate automatically so as to be able to continually produce the desired pseudo-ghost signal for ghost cancellation without the need for user adjustment.

In accordance with the principles of the present invention, a television ghost signal cancellation system is provided in which the video intermediate frequency signal is demodulated by two synchronous detectors. A picture carrier extractor produces a first reference signal for the first of the synchronous detectors exhibiting a phase which is aligned with that of the picture carrier of the direct television signal. The first reference signal is shifted in phase by a controllable phase shifter to develop a second reference signal for the second synchronous detector. The output of the second synchronous detector is delayed by an amount of time equal to the difference in time between the appearance of the direct signal and a detected ghost signal. The amplitude and polarity of the delayed signal are adjusted by a control circuit to produce a pseudo-ghost signal. An amplitude comparator compares the amplitude of the pseudo-ghost signal with that of the output signal of the first synchronous detector. The resultant amplitude comparison signal is sampled and stored during a sampling interval, and the stored signal is used to control the adjustment provided by the amplitude and polarity control circuit. A phase comparator is responsive to the outputs of the amplitude and polarity control circuit and the first synchronous detector for producing a phase comparison signal. The phase comparison signal is sampled and stored during a sampling interval, and the stored phase comparison signal is used to control the phase shift provided by the controllable phase shifter. The pseudo-ghost signal and the output of the first synchronous detector are summed to produce a deghosted video signal.

Figure 1:
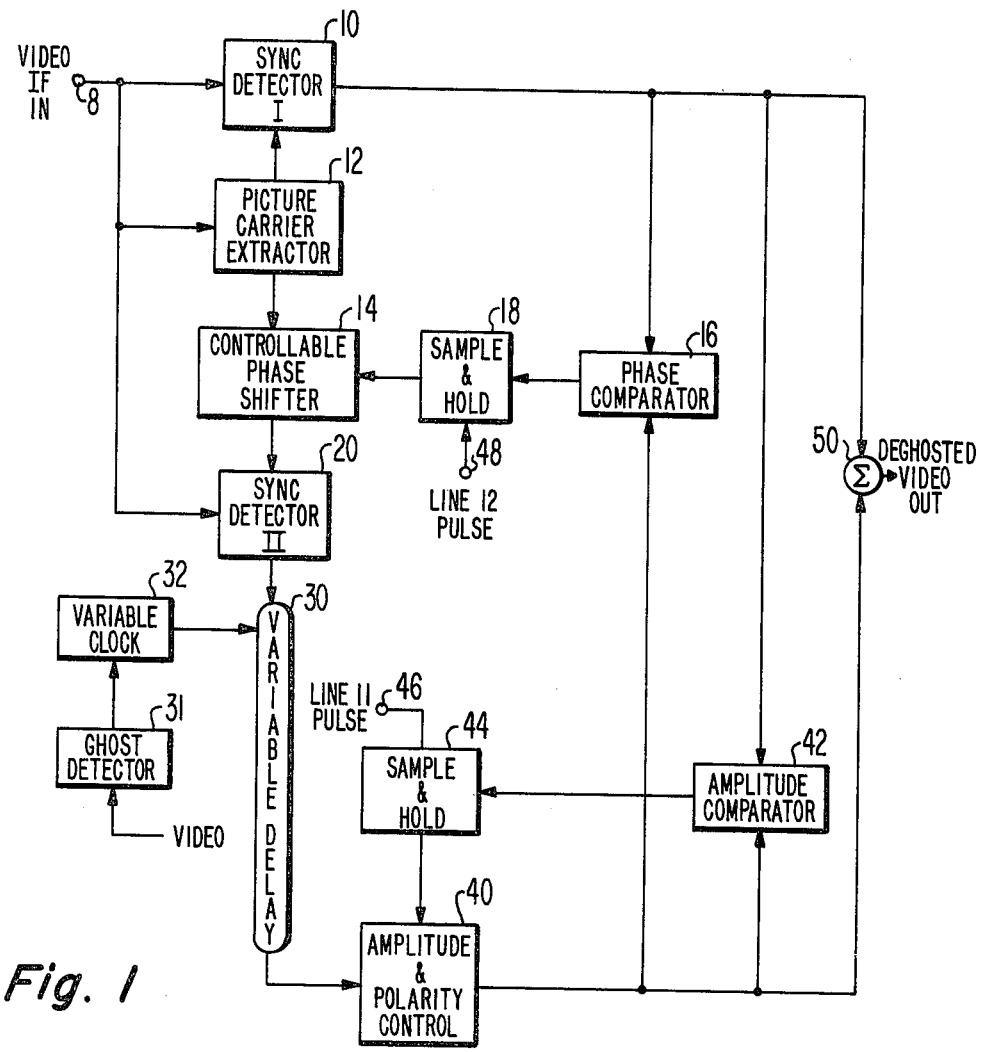
FIG. 1 illustrates, in block diagram form, a television ghost cancellation system constructed in accordance with the principles of the present invention.

Referring to the ghost signal cancellation system of FIG. 1, a video intermediate frequency signal, which is subject to contamination by a ghost signal, is applied to an input terminal 8. The applied video IF signal is coupled to the inputs of a first synchronous detector 10, a picture carrier extractor circuit 12, and a second synchronous detector 20. The picture carrier extractor circuit produces a first reference signal aligned in phase and frequency with the picture carrier of the direct or main video IF signal, which reference signal is applied to the first synchronous detector 10 and the signal input of a controllable phase shifter 14. The controllable phase shifter 14 applies a second reference signal to the second synchronous detector 20. The controllable phase shifter may be constructed in a similar manner as the variable phase shifter shown in U.S. Pat. No. 4,047,224.

The output of the second synchronous detector 20 is coupled to the input of a variable delay line 30. The variable delay line 30 may be constructed of a plurality of charge-coupled delay (CCD) elements driven by a variable clock 32. The delay imparted to the applied signal is determined by the number of delay elements and the frequency of the clock signal. The frequency of the clock signal is controlled by a ghost detector system 31. The delayed signal at the output of the variable delay line 30 is applied to the input of an amplitude and polarity control circuit 40. The output of the amplitude and polarity control circuit 40 is coupled to the inputs of a phase comparator 16, an amplitude comparator 42, and a summing network 50. A second input of the summing network 50 is coupled to the output of the first synchronous detector 10, and a video output signal is produced at the output of the summing network 50.

The phase comparator 16 has a second input coupled to the output of the first synchronous detector 10, and produces a phase comparison signal at an output, which is applied to an input of a first sample and hold circuit 18. The sample and hold circuit 18 samples the phase comparison signal upon the application of a sampling signal (line twelve pulse) to its control input terminal 48. The signal stored by the sample and hold circuit 18 is applied to a control input of the controllable phase shifter 14.

The amplitude comparator 42 has a second input coupled to the output of the first synchronous detector 10, and produces an amplitude comparison signal at an output, which is applied to an input of a second sample and hold circuit 44. The sample and hold circuit 44 samples the amplitude comparison signal upon the application of a sampling signal (line eleven pulse) to its control input terminal 46. The signal stored by the sample and hold circuit 44 is applied to a control input of the amplitude and polarity control circuit 40.

The television ghost signal cancellation system of the present invention embodied in FIG. 1 operates in cooperation with the ghost signal detection system 31, which may be of the types shown in my U.S. patent application Ser. Nos. 228,595 and 230,310, entitled "TELEVISION SIGNAL GHOST DETECTOR" and "TELEVISION GHOST DETECTOR SYSTEM", respectively, and filed on Jan. 26, 1981. The application Ser. No. 228,595 describes a system which detects a television ghost signal and controls a voltage controlled oscillator to clock a CCD delay line so that the main television signal appears at the output of the delay line at the time that its corresponding ghost signal component is applied to the input of the delay line. Such a voltage controlled oscillator may be used as the variable clock 32 for the variable delay line 30 of the present invention. My patent application Ser. No. 230,310 shows an alternate technique for ghost detection which produces a voltage controlled oscillator control voltage without the use of a variable delay line.

The ghost detector systems of my above-mentioned patent applications and the ghost cancellation system of the present invention both use a component of the video signal of known characteristics as a training signal. The training signal is followed in time by a video signal interval which contains no picture information. If the video signal is contaminated by a ghost signal, a corresponding ghost of the training signal will appear during this interval and the ghost may therefore be readily detected and analyzed. Typical training signals and intervals used for ghost detection and cancellation include line 266 of the vertical synchronizing interval, the lines of the vertical retrace interval following the vertical synchronizing pulses, and specially transmitted pulses inserted into unused lines of the vertical retrace interval, such as sine-squared pulses. In the embodiments shown in my above-described patent applications, line ten of the vertical retrace interval, which contains a horizontal synchronizing pulse followed by no video information, is illustratively used as the training signal interval for the ghost detectors there shown. When the video signal is contaminated by a ghost signal, a ghost of the horizontal sync pulse appears during the line interval following the main sync signal, and is detected. In the ghost cancellation system of the present invention, a pulse coincident in time with that portion of line eleven following the training signal, which line, like line ten, contains a horizontal synchronizing pulse and no picture information, is used to control sample and hold circuit 44, and a similar pulse, coincident with that portion of line twelve succeeding the training signal, is used to control sample and hold circuit 18. These control pulses may be derived in a similar manner as the line ten gating signal of my application Ser. No. 228,595.

Figure 2:
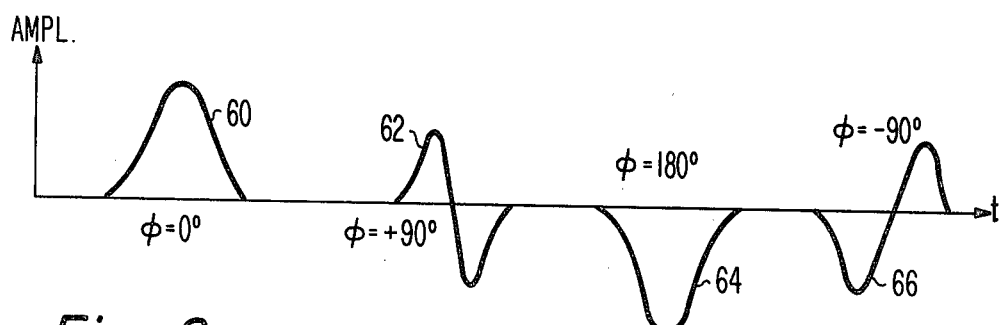
FIG. 2 illustrates the effects of carrier phase difference on a sine-squared pulse.
Figure 3:
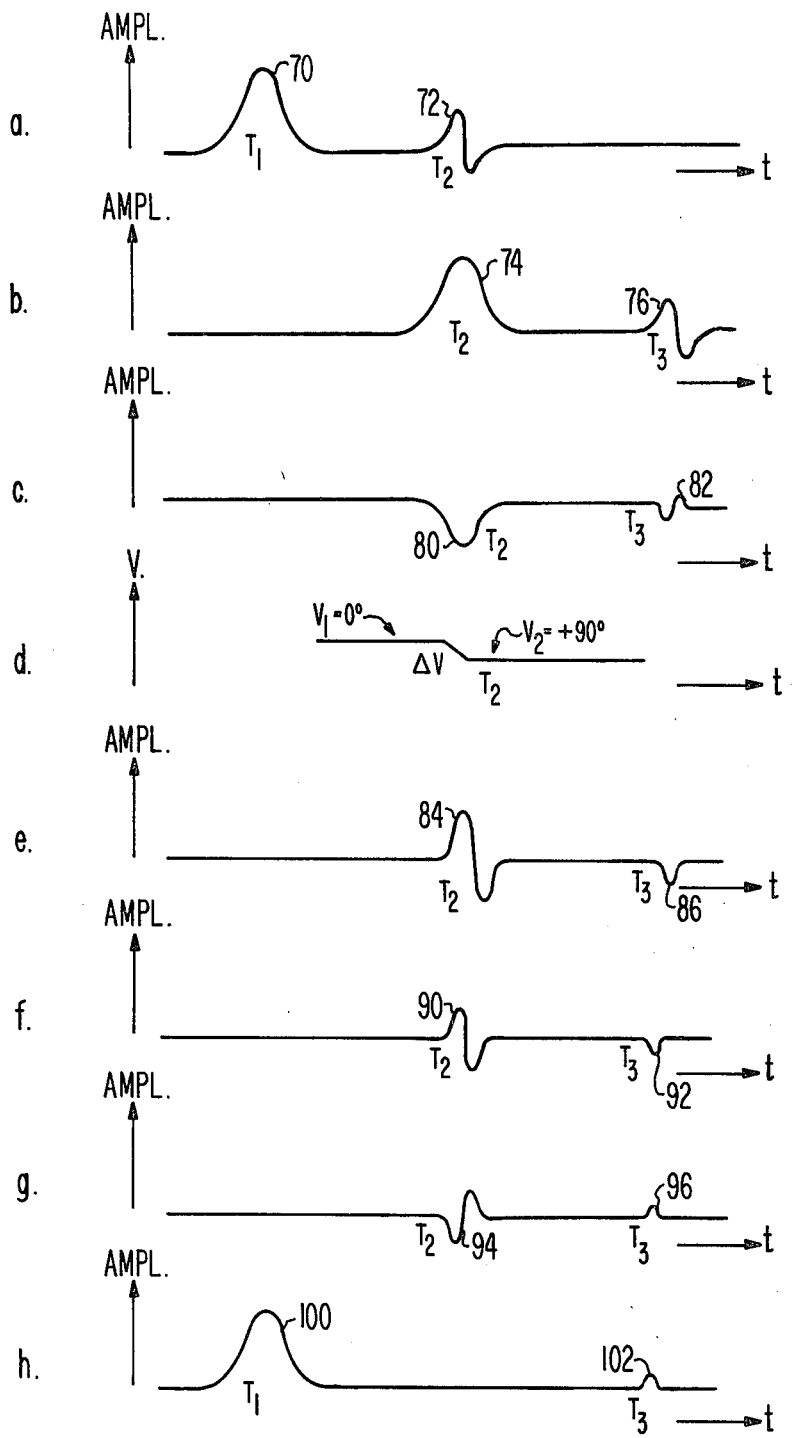
FIG. 3 illustrates waveforms depicting the operation of the system of FIG. 1.

The operation of the arrangement of FIG. 1 is explained by referring to the waveforms of FIGS. 2 and 3. For ease of illustration, it will be assumed that lines eleven and twelve of the video signal each contain a sine-squared 2T pulse to be used as the training signal, although it is to be understood that the horizontal synchronizing pulses of these lines may be used as training signals with similar results. The 2T pulse is used for this example because it exhibits the known property of negligible energy at frequencies above $f = 1/\text{h.a.d.}$, where h.a.d. is the half amplitude duration, or pulse width, as measured at the 50% points. For a 2T pulse in the NTSC television system, T is defined as the Nyquist interval and is equal to 0.125 microseconds. For this 2T pulse, $\text{h.a.d.} = 0.25$ microseconds, and the cutoff frequency is seen to be 4.0 MHz, above which frequency the pulse energy is negligible.

When the main video signal applied to terminal 8 of FIG. 1 contains a 2T pulse, and the video signal is demodulated by the synchronous detector 10 using a reference signal aligned in phase and frequency with the main video carrier signal, the demodulated video signal will contain the 2T pulse 60, as shown in FIG. 2. If the main video signal is contaminated by a ghost signal, and the phase of the ghost carrier signal is aligned in phase with the main video carrier signal, the ghost 2T pulse will also resemble pulse 60, although at a reduced amplitude. But if the ghost signal carrier is in a different phase relationship with the main signal carrier, such as $+90°$, $180°$ or $-90°$ ($= +270°$), the demodulated ghost signal will take on a different appearance, as shown by waveforms 62, 64 and 66, respectively, of FIG. 2. The shape of the demodulated 2T signal ghost is a function of the phase relationship between the synchronous detector reference signal and the ghost carrier signal phase. Since this relationship is a random one dependent upon the relation of the lengths of the main and ghost signal paths, any intermediate waveform to those shown in FIG. 2 is also a possibility.

When the ghost detector system 31 detects no ghost signals in the video signal, the variable clock 32 of FIG. 1 is disabled so that no signal appears at the output of the variable delay line 30. The video signal applied to terminal 8 will be demodulated in the conventional manner by the first reference signal in the first synchronous detector, and the baseband video signal passes through the summing network 50 without alteration for subsequent signal processing.

When the ghost detector 31 detects the presence of a ghost signal, the variable clock 32 is activated, causing the delay line 30 to provide a delay such that signals applied to the delay line 30 are delayed by the time interval between the appearance of the main and corresponding ghost signal components. When the controllable phase shifter 14 provides no phase shift to the applied carrier signal, both synchronous detectors 10 and 20 will produce the same demodulated output signal, as illustratively shown in FIG. 3a. The 2T pulse 70 is the training pulse inserted in a vacant line of the vertical retrace interval which occurs at a time $T_1$. The 2T pulse 70 is followed in time by its ghost pulse 72, occurring at time $T_2$. In this example, it may be seen that the ghost pulse 72 results from a $+90°$ phase difference between the carrier signal of the main 2T pulse 70 and the carrier signal of the ghost pulse 72.

The waveform of FIG. 2a which is produced by the second synchronous detector 20 is delayed by the delay line 30 by the time duration between $T_1$ and $T_2$ to produce the delayed waveform shown in FIG. 3b. The delayed 2T pulse 74 is in time coincidence with the ghost pulse 72 at the output of the first synchronous detector 10, at time $T_2$. The delayed ghost signal 76 occurs at a later time $T_3$. The delayed signals of FIG. 3b are applied to the amplitude and polarity control circuit 40, which inverts the signals and applies them to the amplitude comparator 42. The amplitude comparator 42 compares the two signals 72 and 74 which appear at its inputs at time $T_2$, and the result of the comparison is applied to sample and hold circuit 44. The sample and hold circuit 44 is keyed to store the signal representative of the comparison, and the stored value is applied to the amplitude and polarity control circuit as a control signal. Since the amplitude comparison loop is striving to maintain signals at the inputs of the amplitude comparator 42 and the summing circuit 50 which cancel each other, the stored control signal in this example will cause the amplitude and polarity control circuit to both invert and attenuate the delayed signals of FIG. 3b.

During the next training signal interval (line twelve in this example), if the ghost signal has not changed, the first and second synchronous detectors will again produce the waveform of FIG. 3a. The amplitude and polarity control circuit now operates under the influence of the stored control signal to invert and attenuate the delayed waveforms, producing an output signal as shown in FIG. 3c. The delayed, inverted and attenuated main signal 2T pulse 80 is compared in phase with the ghost pulse 72 at the output of the first synchronous detector 10 by the phase comparator 16. Since the two pulses have a phase difference of +90° at time $T_2$, the phase comparator 16 will produce a signal representative of this condition at this time. This phase comparison signal is sampled and stored by sample and hold circuit 18, which produces an output signal change $\Delta V$, from a level $V_1$ to a level $V_2$, at time $T_2$ as shown in FIG. 3d. The level $V_1$ was causing the controllable phase shifter 14 to provide no phase shift, but the new output signal level $V_2$ will cause the phase shifter 14 to provide a 90° phase shift to the applied reference signal. The second synchronous detector 20 will now demodulate the applied video signals with a reference signal having a 90° phase relationship with respect to the first reference signal and the main signal picture carrier.

During the next sampling interval (line eleven of the following field in this example), the first synchronous detector 10 will again produce the waveform of FIG. 3a. The second synchronous detector 20 and the delay line 30 will produce the delayed waveform shown in FIG. 3e due to the 90° phase shifted reference signal. The delayed main 2T pulse appears as shown at 84, and the delayed ghost 2T pulse appears as shown at 86 as a result of the 90° shift of the demodulating reference signal of the second synchronous detector 20. The waveform of FIG. 3e is attenuated by the amplitude and polarity control circuit 40, which produces the intermediate waveform shown in FIG. 3f, and is also inverted by the control circuit 40 to produce the pseudo-ghost signal waveform shown in FIG. 3g. The amplitude comparator 42 and the sample and hold circuit 44 define the control signal applied to the amplitude and polarity control circuit 40 so that the pseudo-ghost pulse 94 is the complement of the ghost pulse 72 of FIG. 3a. When the two waveforms of FIGS. 3a and 3g are combined by the summing network 50, the deghosted waveform of FIG. 3h results, which contains only a small residual ghost signal 102 in addition to the desired 2T pulse 100 of the main signal. If desired, the residual ghost can be cancelled in a similar manner by another cancellation system.

Further refinement of the phase shift control signal stored by sample and hold circuit 18 will occur during the next sampling interval, if necessary (line twelve of the second field). The ghost cancellation system is now operating in a condition in which the ghost signals of the video picture interval will be continuously cancelled. The process will continue indefinitely until the ghost moves in time, changes in amplitude, or disappears, at which time the phase and amplitude comparators 16 and 42 and the sample and hold circuits will again adjust the control signal values for the controllable phase shifter 14 and the amplitude and polarity control circuit 40.

What is claimed is:

1. In a television receiver, including a source of desired intermediate frequency video signals including a picture carrier, said signals being subject to contamination by a ghost signal which includes a ghost signal picture carrier;

a picture carrier extractor circuit having an input responsive to said intermediate frequency video signals and an output at which a first reference signal substantially aligned in phase and frequency with the picture carrier of said video signals is produced; a first synchronous detector having a first input coupled to receive said intermediate frequency video signals including said ghost signal when present, a second input coupled to receive said first reference signal, and an output at which a first baseband video signal is produced; and a television signal ghost detector responsive to said first baseband video signal for determining the time interval between the occurrence of said video signals and their corresponding ghost signal components when a ghost signal is present; a television signal ghost cancellation system comprising:

a controllable phase shifter having a signal input coupled to receive said first reference signal, a control signal input, and an output at which a second reference signal is produced;

a second synchronous detector having a first input coupled to receive said intermediate frequency video signals, a second input coupled to receive said second reference signal, and an output at which a second baseband video signal is produced;

a variable delay line having an input coupled to the output of said second synchronous detector, and an output at which a delayed video signal is produced, and coupled to said ghost detector for delaying said second baseband video signal by an amount of time substantially equal to the time interval between the occurrence of said video signals and their corresponding ghost signal components when a ghost signal is present;

an amplitude and polarity control circuit having a signal input coupled to the output of said delay line, a control input, and a signal output for producing a pseudo-ghost signal;

amplitude comparison means having a first input coupled to the output of said first synchronous detector, a second input coupled to the output of said amplitude and polarity control circuit, and an output coupled to the control input of said amplitude and polarity control circuit for causing said pseudo-ghost signal to be substantially equal in amplitude and opposite in polarity to said ghost signal of said first baseband video signal;

phase comparison means having a first input coupled to the output of said first synchronous detector, a second input coupled to the output of said amplitude and polarity control circuit, and an output coupled to the control input of said controllable phase shifter for causing said phase shifter to shift the phase of said first reference signal by an amount substantially equal to the phase difference between said picture carrier of said desired intermediate frequency video signals and said picture carrier of said ghost signal; and means coupled to the outputs of said first synchronous detector and said amplitude and polarity control circuit for combining said first baseband video signal with said pseudo-ghost signal to produce a deghosted video signal.

2. The arrangement of claim 1, wherein said baseband video signal includes a component available for use as a training signal; and wherein said phase comparison means comprises:

a phase comparator having a first input coupled to the output of said first synchronous detector, a second input coupled to the output of said amplitude and polarity control circuit, and an output at which a phase comparison signal is produced; and a sample and hold circuit having a signal input coupled to the output of said phase comparator, a signal output coupled to the control input of said controllable phase shifter, and a control input responsive to a sampling signal, for sampling and storing said phase comparison signal during a sampling interval following the occurrence of said training signal.

3. The arrangement of claim 2, wherein said amplitude comparison means comprises:

an amplitude comparator having a first input coupled to the output of said first synchronous detector, a second input coupled to the output of said amplitude and polarity control circuit, and an output at which an amplitude comparison signal is produced; and a second sample and hold circuit having a signal input coupled to the output of said amplitude comparator, a signal output coupled to the control input of said amplitude and polarity control circuit, and a control input responsive to a sampling signal, for sampling and storing said amplitude comparison signal during a sampling interval following the occurrence of said training signal.

4. The arrangement of claim 3, wherein said baseband video signal includes a second component available for use as a training signal, and wherein said control input of said second sample and hold circuit is responsive to a sampling signal for sampling and storing said amplitude comparison signal during a second sampling interval following the occurrence of said second training signal.

5. The arrangement of claim 3 or 4, wherein said combining means comprises a signal summing network.

6. The arrangement of claim 5, wherein said amplitude and polarity control circuit inverts and attenuates said delayed video signal produced by said variable delay line.

* * * * *